United States Patent
Andersson et al.

(10) Patent No.: US 10,073,007 B2
(45) Date of Patent: Sep. 11, 2018

(54) RELIABILITY LIMITS OF MACHINES AND COMPONENTS THEREOF

(75) Inventors: Magnus Andersson, Trollhattan (SE); Henrik Eckervald, Trollhattan (SE)

(73) Assignee: GKN Aerospace Sweden AB, Trollhattan (SE)

( * ) Notice: Subject to any disclaimer, the term of this patent is extended or adjusted under 35 U.S.C. 154(b) by 595 days.

(21) Appl. No.: 14/427,008

(22) PCT Filed: Sep. 12, 2012

(86) PCT No.: PCT/SE2012/000132
§ 371 (c)(1),
(2), (4) Date: Aug. 18, 2015

(87) PCT Pub. No.: WO2014/042561
PCT Pub. Date: Mar. 20, 2014

(65) Prior Publication Data
US 2015/0377739 A1  Dec. 31, 2015

(51) Int. Cl.
*G01M 15/14* (2006.01)
*G05B 23/02* (2006.01)

(52) U.S. Cl.
CPC ......... *G01M 15/14* (2013.01); *G05B 23/0283* (2013.01)

(58) Field of Classification Search
CPC .................... G01M 15/14; G05B 23/02383
See application file for complete search history.

(56) References Cited

U.S. PATENT DOCUMENTS

| | | | |
|---|---|---|---|
| 7,149,657 B2 * | 12/2006 | Goebel | G06Q 10/06 700/108 |
| 7,328,625 B2 * | 2/2008 | Sundermeyer | G01N 3/32 73/806 |
| 2006/0241910 A1 | 10/2006 | Petchenev et al. | |
| 2011/0135473 A1 | 6/2011 | Singamsetti et al. | |
| 2012/0095574 A1 | 4/2012 | Greenlee | |

OTHER PUBLICATIONS

International Search Report for PCT/SE2012/000132 dated Jul. 12, 2013 (5 pages).

* cited by examiner

*Primary Examiner* — Kristal Feggins
(74) *Attorney, Agent, or Firm* — Bejin Bieneman PLC

(57) ABSTRACT

A reliability range is determined for a parameter of a component in a machine subjected to life reducing loads during operation, comprising the steps of: acquiring, for each of a plurality of load sessions, at least one parameter value for said component; generating a distribution pattern containing said parameter values for the plurality of load sessions; assigning a reliability range for the distribution pattern, wherein parameter values outside said reliability range are considered as being unrealistic; analyzing the parameter values outside the reliability range to determine which of said parameter values outside the reliability range are confirmed to be unrealistic; and adjusting the reliability range if a ratio between the confirmed unrealistic parameter values and the considered unrealistic parameter values is outside a further range being predetermined for the ratio.

10 Claims, 5 Drawing Sheets

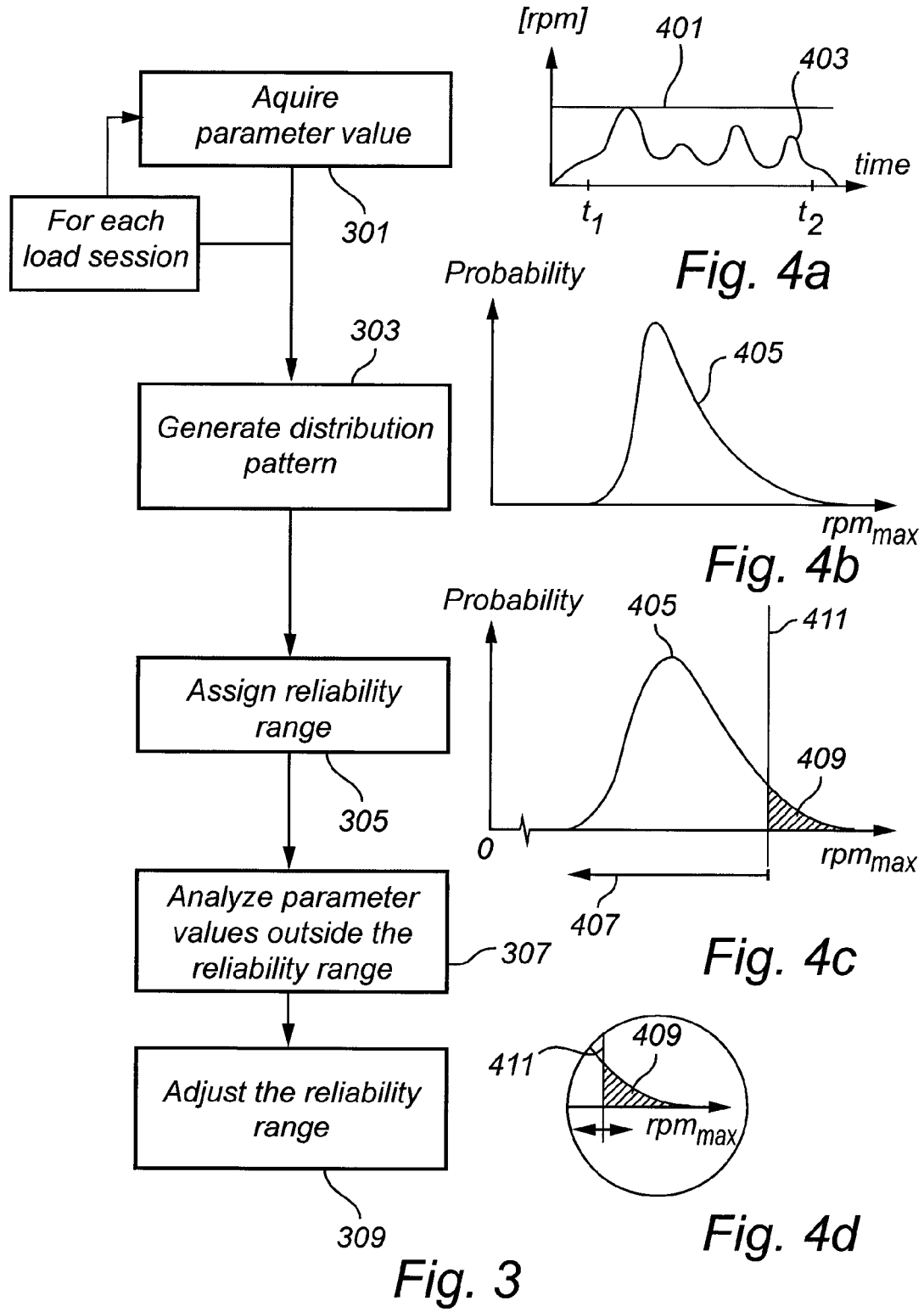

RELIABILITY LIMITS OF MACHINES AND COMPONENTS THEREOF

CROSS-REFERENCE TO RELATED APPLICATIONS

This application is a National Phase of, and claims priority to, International Application No. PCT/SE2012/000132 filed on Sep. 12, 2012, which application is hereby incorporated by reference in its entirety.

BACKGROUND

Today, there is significant interest in developing methods and systems for improving the prediction of the life consumption of individual components in a machine, in particular machines with moving parts. By improving the accuracy of such methods, the applied safety limits may be reduced, and unnecessary replacement of components may be avoided. When applied to an entire fleet (e.g. a military aircraft fleet) the cost savings may be significant as well as allowing for an increased operational lifetime. Furthermore, in the unusual event that conventional methods are too optimistic, refined methods may avoid failure of components, thus avoiding uncalculated stops in operation or even more importantly accidents.

Examples of interesting applications where improved life consumption predictions may be useful include aircrafts, gas/steam turbines, trucks, loaders, nuclear plants and wind turbines.

A conventional method for predicting the life consumption of a component in a machine is to measure one or a combination of the usage/run time, distance or count the number of cycles of a predefined load session or a conservative load session. A load session is the time when the machine is in operation, for example for an aircraft a load session may be defined as flying from point A to point B with a predefined rotor speed variation. Prediction of the estimated life consumption of the component may thereafter be calculated by using a numerical calculation method, such as e.g. the finite element method, FEM. The FEM-method calculates stresses and strains for the component exposed to various loads during the load session, such as e.g. thermal and mechanical loads. The FEM-method calculates stresses and strains by using a mesh pattern on e.g. a 20-model or a 30-model, wherein the mesh pattern comprises nodes and elements. By utilizing a denser mesh, i.e. smaller elements per area resulting in a larger number of nodes and elements, the accuracy of the results are improved.

Although the FEM-method itself provides for a substantially accurate method for determining e.g. stresses and strains of a component resulting from a flight session, there are still a plurality of variables that may be inaccurate when evaluating e.g. the predicted life consumption of the component. The inaccurate variables may derive from the fact that e.g. fault measurements have been made, the calculation models are outside their valid range, etc. In order to avoid receiving and using inaccurate results from the flight sessions, an engineer has to evaluate each of the results to determine if they are within reasonable limits or not. Thereafter, the engineer may decide to rely on the calculated results or determine that an error has occurred somewhere along the calculation procedure and investigate the reason for the unreasonable result. This manually provided determination is very time consuming and inefficient.

Accordingly, there is a need to provide a method for increased automatization when evaluating parameterization reliability for components exposed to loads during operation.

SUMMARY

Disclosed herein is determining a reliability range for a parameter of a component in a machine subjected to life reducing loads during operation, and also determining if a parameter value for a component in a machine subjected to life reducing loads during operation is realistic. Further disclosed is predicting life consumption of a component in a machine subjected to life reducing loads during operation. Additionally disclosed is a system and computer program product for the foregoing.

Accordingly, disclosed is a method that reduces the manual workload when evaluating calculation results, by generating ranges in which parameter values can be considered to be reliable and realistic.

The present disclosure is based on the insight that by acquiring a plurality of parameter values resulting from a plurality of load sessions of a machine subjected to life reducing loads during operation, a ratio of these values will, for some reason, be unrealistic, i.e. they will, for example, have values which, due to the nature of the load session, are not physically realistic. By providing a method which automatically sorts out these values, the work load for e.g. an engineer will be reduced since he/she does not have to evaluate all the parameter values acquired during the load session.

According to an aspect of the present disclosure, there is provided a method for determining a reliability range for a parameter of a component in a machine subjected to life reducing loads during operation, comprising the steps of acquiring, for each of a plurality of load sessions, at least one parameter value for the component, generating a distribution pattern containing the parameter values for the plurality of load sessions; assigning a reliability range for the distribution pattern, wherein parameter values outside the reliability range are considered as being unrealistic, analyzing the parameter values outside the reliability range to determine which of the parameter values outside the reliability range are confirmed to be unrealistic, and adjusting the reliability range if a ratio between the confirmed unrealistic parameter values and the considered unrealistic parameter values is outside a further range being predetermined for the ratio.

The wording "reliability range" should in the following and throughout the entire description be interpreted as a range in which parameters are considered, or will be considered, to have a value which is realistic and can be used when, for example, evaluating and predicting accumulated life consumption of the component. For example, after the plurality of load sessions have been carried out, or e.g. data has been collected from a plurality of stored load sessions, a statistical distribution pattern can be generated for a specific parameter. Thereafter, the reliability range is set in order to initially determine between which threshold limits the values are considered to be reliable. Parameter values outside the threshold limits are considered unrealistic and are analyzed in more detail to determine if the reliability range should be increased or decreased.

Accordingly, the step of assigning a reliability range is initially made based on e.g. experience of the specific parameter and component which is described below. It is hence a range which initially may be set relatively arbitrarily and by iteratively analyzing values outside the reliability range and adjusting the reliability range, a statistically correct range including realistic and reliable parameter values can be provided. The analysis of the parameter values may, for example, be executed by e.g. an engineer who evaluates the values outside the reliability range to determine if they are realistic or not. The evaluation may be executed by checking if the values are within reasonable limits for the specific load session, which may be made by use of e.g. a computer program calculating parameter values by the Finite Element Method, FEM.

Moreover, the analysis of the parameter values outside the reliability range may be executed automatically, i.e. without the need of an engineer checking "manually" if the parameter values are realistic or not. This may be executed in numerous ways, for example, a computer program may evaluate the time history of the parameter which was determined unreliable. If the time history is discontinuous, i.e. it comprises some irregularities, the parameter value can be confirmed unrealistic. Also, the same, or other, computer program may be configured to confirm the unreliable value if correlation between input and output is not within predetermined limits. As an example of the latter, certain parameters regarding e.g. a blade of a turbine should correlate to the rotational speed of the turbine, i.e. the rotational speed is the input while the blade parameter is the output.

Also, for some parameters, values may have a physical extreme value and parameter values outside such an extreme value can be considered unrealistic without the need of a computer program. An example of such a parameter may be the rotor speed of an engine which value cannot be negative. If an rpm-parameter value is recorded as negative, this value is by its nature unrealistic.

Furthermore, the above wording "further range" should be interpreted as a range defined by a ratio of the "confirmed unrealistic parameters" and the "considered unrealistic parameters". When generating the reliability range it is hence important that parameter values within the reliability range are realistic and reliable. Accordingly, parameter values outside the reliability range should, to a certain degree, be comprised of unrealistic and unreliable parameter values. However, if a too large amount of parameters outside the reliability range are unrealistic it might be a risk that also some of the parameter values within the reliability range are unrealistic and unreliable. For example, if 95% of the parameter values outside the reliability range are confirmed unrealistic and unreliable, it might be desirable to reduce the reliability range to be sure that none of the parameter values within the reliability range are unrealistic. On the other way around, if only e.g. 10% of the parameter values outside the reliability range are confirmed unrealistic, the reliability range may be increased so that more realistic and reliable parameter values are provided within the reliability range. Accordingly, the method iteratively adjusts the reliability range so that a desired amount of unrealistic and unreliable parameter values are provided outside the reliability range. Depending on the specific application, the further range may be set differently. For example, for parameters of an aircraft it may be important that absolutely all parameter values are realistic and reliable, and the further range may hence be set such that a number of parameter values outside the reliability range are in fact realistic and reliable. However, for other types of machines this may not be absolutely necessary.

An advantage of the present disclosure is, at least, that by iteratively setting a reliability range for a parameter of a component, the workload when evaluating if the values of the parameter resulting from a load session are within reasonable limits is reduced. Hereby, when the reliability limit is set and a machine thereafter is subjected to a load session, an automatic determination if the parameter value is reliable or not may be provided.

Accordingly, an engineer or the like do not have to provide e.g. an analysis to verify the "correctness" of the specific value. In fact, for an example of predicting life consumption of a component, analysis can be made for a machine exposed to load sessions without the need of manually verifying the different parameters. Load sessions resulting in parameter values which are automatically considered unrealistic should, however, when evaluating the exemplified accumulated life consumption, be included when predicting the remaining total life the component. In such a case, conservative life consumption calculations may be provided for those specific load sessions.

Moreover, the step of assigning a reliability range may be executed by setting a predetermined range based on type of parameter and/or component. Hereby, the reliability range may initially be set differently depending on the specific parameter and/or component being evaluated. Furthermore, confirming, if the parameter values are realistic, may be executed by means of comparison to substantially similar load sessions. Hereby, if a parameter value, in comparison to values for that parameter for similar types of load sessions is differing to a specific amount, the parameter value may be considered unrealistic and unreliable. As also described above, some parameters may also have physical extreme values meaning that parameter values outside such extreme values naturally differ from similar load sessions and are considered unrealistic and unreliable due to both the comparison as well as to the law of nature. Another example of an unrealistic and unreliable parameter value is if the rotor speed of an engine is recorded as faster than what the engine is designed for.

According to an example embodiment, the parameter may be a time-dependent parameter comprising, for each of the plurality of load sessions, a maximum parameter value and a minimum parameter value. Examples of time-dependent parameters will be described further below.

Furthermore, the distribution pattern may comprise a first distribution portion containing the minimum parameter values, and a second distribution portion containing the maximum parameter values. By separating the maximum parameter values from the minimum parameter values for the plurality of load sessions, separate distribution portions may be provided which may further reduce the manual work load in evaluating the parameter values which are considered unrealistic. The first distribution portion containing the minimum parameter values for the plurality of load sessions may have a reliability range extending from the largest value to the assigned range, i.e. a minimum threshold. Hereby, only the minimum parameter values below a certain minimum threshold, i.e. the reliability range, are considered unrealistic and unreliable. The same is valid for the second distribution portion containing maximum parameter values. Accordingly, the reliability range for the second distribution portion may hence extend from the lowest parameter value to a certain maximum threshold, i.e. the reliability range.

According to an example embodiment, an overall reliability range may be provided, wherein the overall reliability range is defined as extending from a minimum threshold limit of the first distribution portion to a maximum threshold limit of the second distribution portion.

Hereby, the overall reliability range, for minimum and maximum parameter values, determines in which range a parameter value is considered realistic and reliable. Accordingly, the first distribution portion defining minimum parameter values and having a reliability range extending from e.g. a certain minimum threshold up to the largest parameter value within the first distribution portion, while the second distribution portion defining the maximum parameter values and having a reliability range extending from e.g. a certain maximum threshold down to the lowest parameter value within the second distribution portion. Hence, the overall reliability limit should be interpreted as extending between the minimum threshold of the first distribution portion and the maximum threshold for the second distribution portion.

Furthermore, the parameter value may be one of measurable operational data or a value calculated by means of the measurable operational data. For example, the measurable data may be the rotor speed, while the calculated value is the predicted accumulated life consumption caused by the specific rotor speed.

Moreover, the time-dependent parameters may be one of temperature, mass flow, friction heat generation, pressure, rotor speed or heat transfer coefficients for the component in the machine. The types of parameter varies during the load session and as described above, a maximum value and a minimum value is acquired for each of the parameters after the specific load session is finished.

According to further example embodiment, the parameter may be a scalar constituted by a predicted life consumption of the component, and wherein the first distribution pattern comprises scalar values of the predicted life consumption for each of the plurality of load sessions.

When generating a reliability limit for the predicted life consumption, which comprises a scalar value for each of the load sessions, e.g. a percentage of accumulated life for one load session in relation to the total life of the component, there is naturally no maximum or minimum parameter value available and hence only one pattern is provided. It should be readily understood that although time-dependent parameter values, which serves as a basis for predicting the accumulated life consumption, are considered realistic and reliable, the outcome of the predicted life consumption may nevertheless be considered unrealistic and unreliable. A possible reason for such an event may, for example, be that the model which predicts the accumulated life consumption is outside its valid range and therefore has to be modified to be able to predict reliable life consumptions for a wider range of input parameters. A typically unreliable and unrealistic scalar value for the predicted life consumption for one load session is a value which is above 100%. A predicted life consumption close to 100% for a single load session may also be considered unrealistic and unreliable.

The above described distribution patterns may, for example, be constituted by a Weibull distribution pattern. The Weibull distribution pattern is well known and may statistically well represent the behavior for the above described acquired parameters. Other statistical distribution pattern may of course also be used which are well known to the skilled person. Moreover, the load sessions may be constituted by recorded loads from flight missions of aircrafts.

Hereby, when an aircraft has been exposed to a flight mission, the engine of the aircraft is connected to a computer or the like which receives information relating to the specific flight and hence to the time dependent parameters of the engine during the flight mission. Accordingly, depending on different flight conditions during the specific mission such as e.g. weather, pilot behavior, etc. loads affecting the engine due to these conditions are provided from the engine in order to be able to calculate predicted life consumption for components during that specific mission.

According to further aspect of the present disclosure, there is provided a method for determining if a parameter value for a component in a machine subjected to life reducing loads during operation is realistic, comprising the steps of acquiring a parameter value for the component resulting from a load session during operation; comparing the parameter value with a predetermined reliability range, and verifying that the parameter value is realistic if the parameter value is within the predetermined reliability range.

Hereby, an as also described above, automated procedure for determining if a parameter value is reliable or not is provided. Accordingly, those parameter values which are not within the predetermined reliability range are marked as unrealistic and unreliable and should hence not be used when, for example, predicting life consumption of the component. For these load sessions, a conservative prediction of the life consumption may be provided instead. Moreover, the reliability range may be determined in accordance with the above description in relation to the above described aspect.

Further effects and features of this further aspect are largely analogous to those described above.

Additionally, there is provided a method for predicting life consumption of a component in a machine subjected to life reducing loads during operation, comprising the steps of receiving a load session with a plurality of parameter values, determining, if the parameter value is realistic, (for example as discussed above) and selecting one of a plurality of methods for predicting a life consumption depending on, if, the parameter value is determined as realistic or not. By evaluating if the values of the parameter resulting from a load session are within reasonable limits, the time expenditure for predicting the life consumption may be decreased since the calculation method for predicting the life consumption for a component is selected based on whether a parameter value from a load session is realistic or not. Thus, unnecessary time expenditure is avoided due to being able not using data which may not provide results of the life consumption. Load sessions, where parameter values have been determined as realistic, may be utilized in a refined and advanced calculation method for predicting the life consumption. While, for parameter values determined as unrealistic, the selected method is a simplified calculation method for determining the life consumption. The simplified calculation method may preferably be based on a load session cycle count. Further effects and features of this aspect are largely analogous to those described above in relation to the above described aspects of the disclosed subject matter.

As understood by the skilled person, the method(s) may be implemented in a hardware based system achieving essentially analogous advantages as described above.

According to still another aspect of the present disclosure there is provided a computer program product comprising a computer readable medium having stored thereon computer program means for causing a processing unit to assign a reliability range for a parameter of a component in a machine subjected to life reducing loads during operation, wherein the computer program product comprises code for executing any one of the above described methods according to the present invention.

Features of this aspect provide similar advantages as discussed above in relation to the previous discussed aspects.

Further features of, and advantages with, the present invention will become apparent when studying the appended claims and the following description. The skilled addressee will realize that different features of the present disclosure may be combined to create embodiments other than those described in the following, without departing from the scope of the subject matter disclosed and claimed herein.

BRIEF DESCRIPTION OF THE DRAWINGS

The above, as well as additional objects, features and advantages of the present disclosure, will be better understood through the following illustrative and non-limiting detailed description of an exemplary embodiment, wherein:

FIG. 3 is a flow chart schematically illustrating a method for determining a reliability range for a parameter of a component in a machine subjected to life reducing loads during operation according to an embodiment;

FIG. 4a-d schematically illustrates the steps in the flow chart in FIG. 3;

DETAILED DESCRIPTION OF EXEMPLARY EMBODIMENTS

Figure 1:
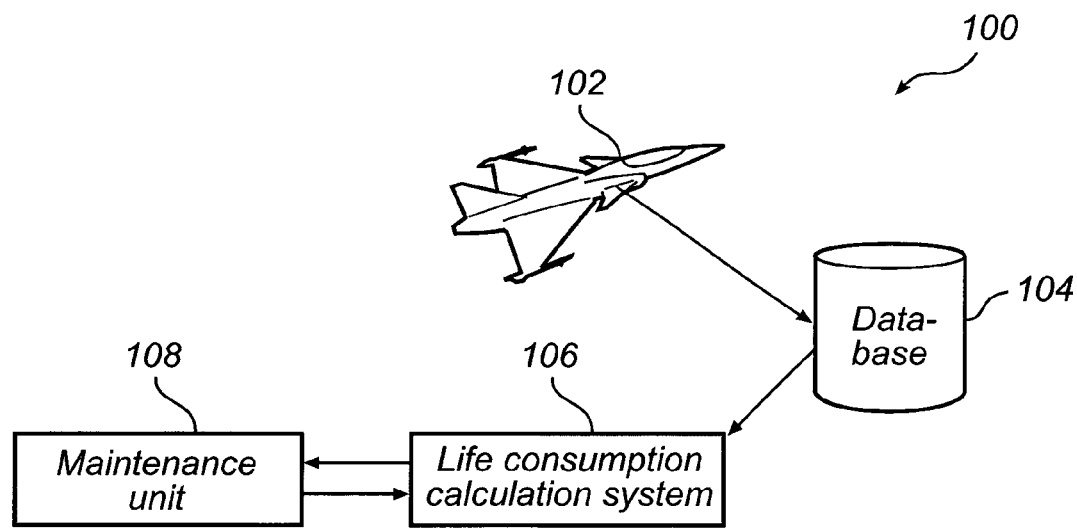
FIG. 1 schematically illustrates an overall maintenance system for an aircraft.

Reference is now made to the accompanying drawings, in which currently preferred embodiments are shown. This present subject matter may, however, be embodied in many different forms and should not be construed as limited to the embodiments set forth herein; rather, these embodiments are provided for thoroughness and completeness, and fully convey the scope of the disclosure to the skilled addressee. Like reference characters refer to like elements throughout. Throughout the description, the expression mechanical component and mechanical part will be used interchangeably. The wording "reliability limit" and "threshold" may be used alternatingly throughout the application.

FIG. 1 schematically illustrates an overall maintenance system 100 for a machine. The maintenance system 100 is an example of a system where the method, and/or the computer program product for determining a reliability range for a parameter of a component in a machine subjected to life reducing loads during operation may be implemented. Methods and computer program product for determining if a parameter value for a component in a machine subjected to life reducing loads during operation is realistic and for predicting life consumption of a component in a machine subjected to life reducing loads during operation may be implemented in the overall maintenance system 100. In FIG. 1 a fighter aircraft 102 is illustrated as an example of the machine, the fighter aircraft 102 comprising a plurality of mechanical parts out of which some are defined as critical life limited. Of course, other machines are possible and within the scope of the invention and may for example be selected from aircrafts (in general), gas/steam turbines, trucks, loaders, nuclear plants and wind turbines.

Figure 2:
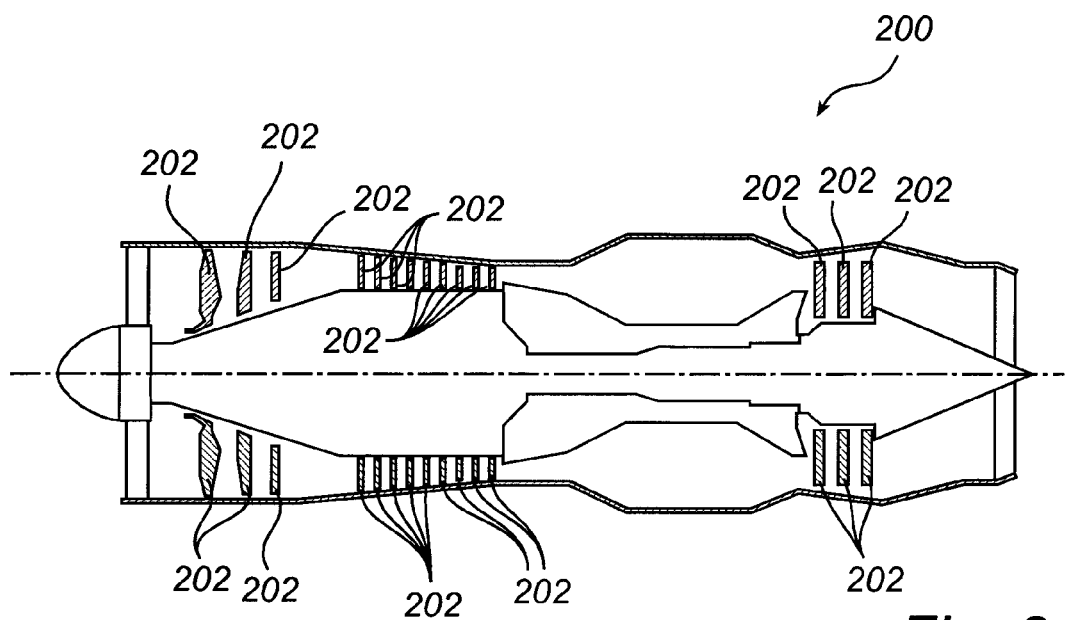
FIG. 2 illustrates a cross-section of a schematical jet engine comprising a number of life limiting components/parts.

In FIG. 2 there is depicted a cross-section of a jet engine 200 comprising of a number of life limiting components 202, the jet engine 200 being specifically exposed to forces that may cause failure to its components/parts. Typically, several of the life limiting components may be rotating components and/or components exposed to high temperatures or other loads. A number of parameters (i.e. operational data) are measured in the jet engine 200 during the time when the machine is in operation (defined as a load session), for example time, power lever angle, altitude, aircraft speed, ambient temperature, inlet temperature, low pressure rotor speed, high pressure rotor speed, combustor pressure, turbine outlet temperature, turbine outlet pressure, control mode of e.g. the aircraft 102. For the fighter aircraft 102 from FIG. 1, the plurality of operational data is recorded and stored in a computer storage medium (not shown) available on the fighter aircraft 102.

With further reference to FIG. 1, the load sessions with recorded data is transferred (e.g. wired or wirelessly) to e.g. a database 104, possibly arranged on the "ground", e.g. separate from the aircraft 102. The data recorded during a flight is referred to as load data from a load session (e.g. corresponding to the first or the second set of operational data). The data stored in the database 104 is used by a life consumption calculation system 106 to predict the life consumption of a component/part of e.g. the jet engine 200. The accumulated life consumption results may be transferred to a maintenance unit 108. The maintenance unit 108 may, after an indication (e.g. a determination made by the maintenance unit 108) that a component is approaching the end of its useful life, determine a suitable maintenance action. The maintenance action may for example be to service the component or to replace it. When a maintenance action has taken place, information of such an (maintenance) event is sent back (instantly, periodically, after a request, etc.) to the life consumption calculation system 106, for example comprising information as to that the component has been serviced or exchanged for another (e.g. new) component, allowing the life consumption calculation system 106 to adapt its calculations based on the current life consumption state of the component. The method and computer program product for determining a reliability range for a parameter of a component in a machine subjected to life reducing loads during operation may be implemented as a part of the maintenance system 100 for example in any one of the fighter aircraft 102, the database 104, the life consumption calculation system 106 and the maintenance unit 108. The presently disclosed subject matter adapted to determine a reliability range for a parameter may be equally applicable for measured parameters, calculated parameters such as life consumption or partial calculations of the life consumption. By determining a reliability range for a parameter, measured or calculated, the safety margins may be reduced when calculating for example life consumption of a mechanical component 202 in a jet engine 200. Furthermore, by separating load sessions based on whether the parameter values are viewed as unreliable and unrealistic or realistic and reliable, the realistic and reliable parameters may be utilized to predict a level of the life consumption with a refined method while the parameters which are confirmed as unrealistic and unreliable may use a simplified calculation method for determining the level of the life consumption of a component. The simplified calculation method for determining the life consumption of the component in a machine may be based on a load session cycle count, such as for example low cycle fatigue.

Reference is now made to the drawings and to FIG. 3 and FIG. 4a-d in particular, schematically illustrating a flow chart of an embodiment of a method for determining a reliability range for a parameter, and associated schematic illustrations of the steps in the flow chart.

In step 301, a parameter value is acquired from a machine for a load session, which in this case is a maximum parameter value. The acquired maximum parameter values from a plurality load session forms a set of data to be used for statistical analysis to reduce the manual workload for engineers in a verifying step. A load session may, for example, be a flight session for an engine of an aircraft flying from point A to point B. Other types of load sessions are of course conceivable, such as a car or a truck driving from one point to another. The following description will, however, for simplicity of understanding only relate to an aircraft. The load session can comprise a plurality of time-dependent parameters which has affected the aircraft during the flight from e.g. point A to point B. The parameters provided to the database from the load session 202 may hence be different depending on, for example, weather conditions during the flight, pilot behavior, etc., and as the parameters are time-dependent, the loads affecting the engine will be continuously registered for the flight from point A to point B. Accordingly, the load session provides time-dependent load data into the life consumption calculation system 106 which generates, according to the loads affecting the engine during the flight, mechanical and thermal loads. The parameter value may also be a scalar from a set of data calculated from parameters measured during the load sessions, such as a life consumption.

Furthermore, it may be desirable to analyze only a part of the load session for some embodiments. Accordingly, the load session may be subdivided by $t_1$ and $t_2$ into a start up cycle, an operational cycle and an end cycle, such that the parameter values are only selected from either of cycle. It may be possible to, in the case of for example parameters as rotor speed denoted by rpm, select the parameter value from the operational cycle in order to disregard the start up cycle and the end cycle of the load sessions for which the minimum parameter value of the rotor speed is always zero.

With reference to step 301, FIG. 4a schematically illustrates a graph comprising a parameter, which in this case is rotor speed measured during a load session. The graph comprises a y-axis and an x-axis, the parameter value of the rotor speed is displayed by the y-axis as revolutions per minute and the time is displayed on the x-axis. The parameter value of the rotor speed during the entire load session is displayed by the function 403 which is formed by measured values of the rotor speed for discrete points in time during the load session. Along the x-axis, $t_1$ and $t_2$ are denoted to indicate the possible subcycles of the load session. The parameter values measured between the time $t_1$ and $t_2$ are the operation cycle of the load session. The dashed maximum parameter line 401 displays the maximum parameter value measured during the load session.

In a subsequent step 303, the set of data formed by a plurality of maximum parameter values is distributed to generate a distribution pattern 405 for the maximum parameter values acquired in step 301. The distribution pattern may be constituted by a Weibull distribution pattern. In FIG. 4b the maximum parameter value, acquired in FIG. 4a, is distributed in the distribution pattern 405 comprising of a plurality of acquired maximum values. The distribution pattern 405 is a Weibull distribution pattern, which is preferably utilized in reliability engineering and failure analysis. The distribution pattern 405 is illustrated in a graph with an y-axis denoting a probability for a parameter value and an x-axis denoting the maximum parameter values of the rotor speed in each load session.

In step 305, a reliability range 407 is assigned to the distribution pattern 405. The assigned reliability range of the distribution pattern is illustrated in FIG. 4c. The reliability range 407 is defined as extending from the lowest parameter value in the maximum distribution pattern up to a certain maximum reliability limit 411, illustrated by a vertical dashed line. The displayed x-axis comprises a discontinuity between zero and the parameter values forming the distribution. The maximum parameter values of the rotor speed outside the reliability range are considered to be unrealistic while the values within the reliability range 407 are considered to be realistic. The region 409 outside the reliability range 407, defined as the unreliable or unrealistic region 409, contains parameter values of the distribution pattern viewed as unrealistic and unreliable.

In the following step, 307, the parameter values for the maximum parameter values being outside the reliability range are analyzed to confirm which of the considered unrealistic parameter values are confirmed as unrealistic. The confirmation may be performed by an engineer experienced with failure and life analysis. The step of confirming whether a parameter value is outside the reliability range may also include information of any physical limitations of the parameters, such as temperature which may not be below the absolute zero point and the rotor speed which may not be a negative value. The experienced engineer may analyze the parameter values by viewing scripts for input and output data for calculation models and other parameter values from the same load session. A particular load session, such as a flight mission for a fighter aircraft, may have had a particularly strenuous session caused by for example troublesome weather that may explain extreme values. Furthermore, some calculation models may for example not be valid for all parameter ranges. Therefore, some values may be unrealistic due to an invalid range for a calculation model used for determining life consumption in a component. The analysis of the parameter values outside the reliability range may be executed automatically. A computer program may evaluate the time history of the parameter which was determined unreliable. If the time history is discontinuous, i.e. it comprises some irregularities, the parameter value can be confirmed unrealistic. Moreover, the computer program may correlate e.g. input and output data and if the correlation is not within predetermined limits the parameter value can be confirmed unreliable and unrealistic.

When the parameter values being outside of the reliability range are confirmed to either be reliable or unrealistic, the reliability range 407 is in step 309 adjusted, if a ratio between the confirmed unrealistic and the total parameter values outside the reliability range is outside a predetermined ratio range. This is illustrated in FIG. 4d, which depicts the end portion of the distribution pattern from FIG. 4c. The reliability range is regulated by increasing or decreasing the reliability limit through the maximum reliability limit 411. The adjustment is here exemplified, the predetermined ratio range may vary between 30-70% without needing to adjust the reliability range, which means that if e.g. 10 parameter values are outside the considered reliability range, then 3-7 of the parameter values in the distribution pattern may be confirmed as unrealistic without needing to adjust the reliability range. However, should only 2 parameter values or less be confirmed as unrealistic, the reliability range 407 may be adjusted such that the maximum reliability limit 411 is "moved" to the right in order to increase the reliability range 407. Vice versa, should more than 7 of the parameter values be confirmed as unrealistic, the reliability range 407 is decrease by moving the maximum reliablility limit 411 to the left. The further range for the ratio is predetermined based on components and/or parameter. Thus the reliability range 407 may be validated, such that it may be used during operation.

When in an operational state, it is possible to compare parameter values received and calculated after each load session to the validated reliability range and be able to determine whether the parameter value is realistic or not.

A reliability range 407 may be implemented for any type of data set for a parameter of a component in a machine subjected to life reducing loads during operation. The acquired parameter values may be a time dependent parameter value, such as the rotor speed, for minimum and/or maximum parameter values. However, the parameter values may simply be a set of scalars which are time-independent. The parameter values may further be acquired from a set of derivatives or integrals calculated from parameters measured during a load session in order to detect unrealistic behavior in the measured data or the models used to for the data.

The flow chart described in FIG. 3 may further be arranged to generate another distribution pattern comprising minimum parameter values. A reliability range for minimum parameter values may be adjusted by a minimum parameter limit which is regulated based on the further ratio range. Life consumption is also a parameter for which the steps in the flow chart in FIG. 3 may be applied. However, since life consumption calculated for a load session is a scalar, only one distribution pattern may be generated. A reliability range may be assigned for the distribution pattern such that some values may end up outside the reliability range at both the lower life consumption values and at the higher life consumption values. In the step of adjusting the reliability range 309, both the lower limit and the higher limit of the reliability range may be adjusted based on the predetermined ratio range of each side respectively or based on the total parameter values outside the reliability range, i.e. in the unrealistic and unreliable region 409 outside the reliability range.

Figure 5:
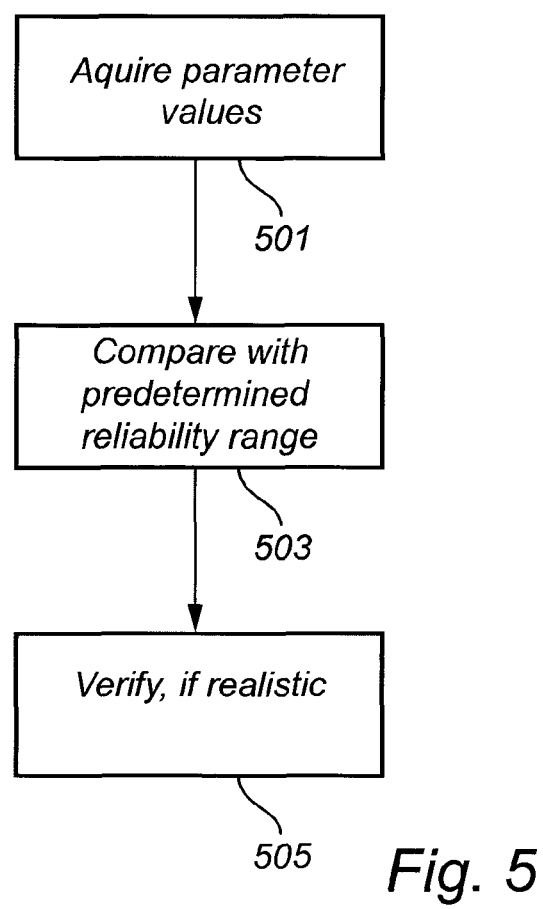
FIG. 5 is a flow chart schematically illustrating a method for determining if a parameter value for a component in a machine subjected to life reducing loads during operation is realistic.

In FIG. 5, a flow chart schematically describes a method for determining, during use, if a parameter value for a component in a machine subjected to life reducing loads during operation is realistic. In the first step, 501, parameter values resulting from a load session during operation are acquired, similarly to step 301 illustrated in FIG. 4a. As mentioned above, the parameter value may for example be time-dependent, a scalar, a calculated life consumption, a maximum parameter value or a minimum parameter value.

In the subsequent step, the parameter value is compared to a predetermined reliability range 407, determined in the flow chart in FIG. 3.

In the final step, 505, the parameter value is verified to be realistic if the parameter value is within the predetermined reliability range.

Figure 6A:
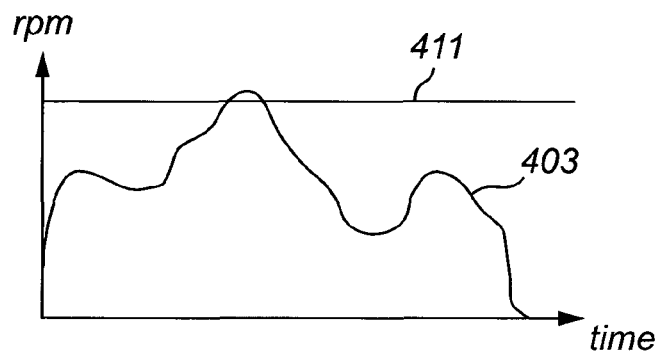
FIG. 6a schematically illustrates a measured load session exceeding the reliability range.

FIG. 6a illustrates for a measured load session similarly to FIG. 4a. Parameter values 403 of the rotor speed for a load session are depicted in FIG. 6 in a graph with a y-axis displaying the rpm and an x-axis displaying time. The parameter values 403 in the load session is compared to the reliability range and if the maximum parameter value exceeds the reliability range 407, the maximum parameter value is outside the predetermined reliability range and is thus unrealistic.

If a parameter value is verified to fall outside the predetermined reliability range, the entire load session may be viewed as unrealistic. However, for some parameters the load session may still be considered as realistic. In the case that a load session is viewed as unrealistic the load session is removed from the set of load data that may be utilized when predicting for example the life consumption. For the unrealistic and removed load sessions, other more simplified calculation methods are used to calculate the life consumption.

Furthermore, the load session may in some applications be divided in subcycles to compare different stages during the operation. For example, the load session may be divided in three time cycles, by $t_1$ and $t_2$, to be able to separate parameter values related to a start-up cycle, an operational cycle and an end cycle, such as illustrated in FIG. 4a. The start-up cycle may, for example, be the time for the engine to start up until it reach idle, the operational time may be the time frame when the engine is running while the end cycle may be the time period when the engine is between idle and until it is switched off. The maximum parameter value, within the time frame $t_1$ and $t_2$, may be compared to the reliability range 407 which is limited by the maximum reliability limit 411. The start-up cycle and the end cycle of the load session may be disregarded as previously mentioned. When comparing the minimum parameter value of the load session for a rotor speed to a predetermined reliability range 407 for minimum parameter values, for some implementations, only the operational cycle may be regarded. This enables the minimum reliability range to be set to other values than zero.

Figure 6B:
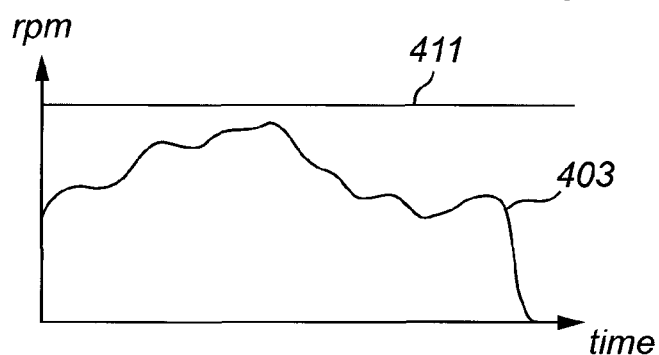
FIG. 6b schematically illustrates a measured load session within the reliability range.

FIG. 6b schematically illustrates parameter values 403 in a graph described in FIG. 6a. In FIG. 6b the maximum parameter value of the load session does not exceed the reliability range illustrated with the maximum reliability limit 411 which implies a realistic and reliable parameter and load session.

Figure 7:
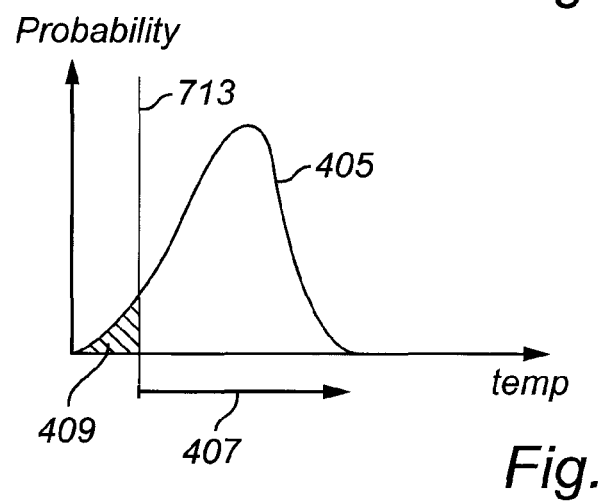
FIG. 7 schematically illustrates a minimum distribution pattern with a determined reliability range.
Figure 8A:
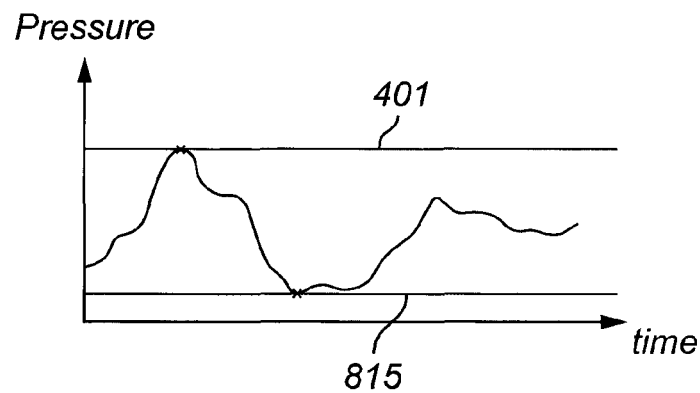
FIG. 8a schematically illustrates an example of a load session for a parameter, wherein the maximum and minimum value of the load session is selected.
Figure 8B:
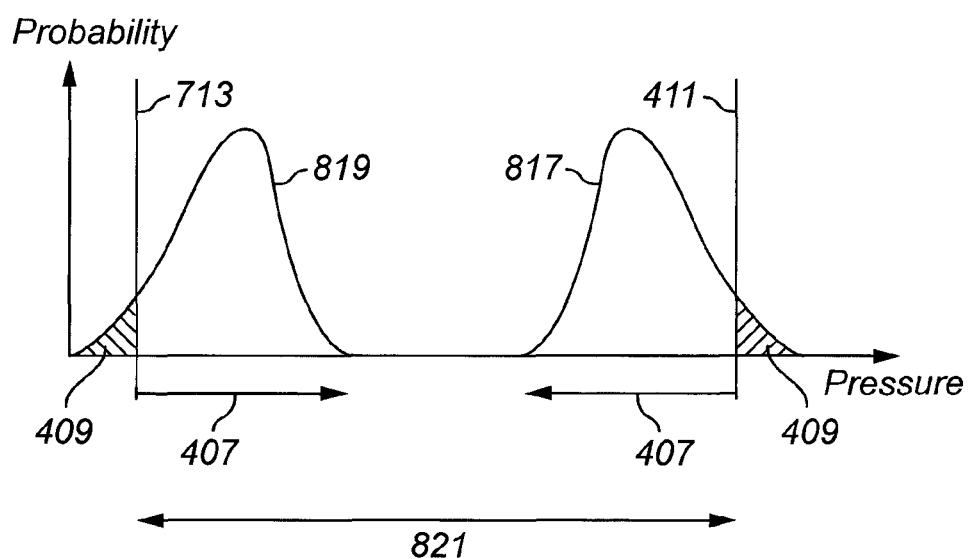
FIG. 8b schematically illustrates an example of a distribution pattern with a first and a second distribution portion with the selected maximum and the minimum values for a plurality of load sessions.

FIG. 7 schematically illustrates a generated distribution pattern 405 for minimum parameter values for a plurality of load sessions. In the example, the parameter values are temperatures of a component in a machine. The distribution pattern 405 is illustrated in a graph with a y-axis describing probability and the x-axis describing temperature. The distribution pattern 405 for minimum parameter values is limited by the reliability range 407, starting from the minimum reliability limit 713 to the maximum of the minimum parameter values. A region outside the reliability range is created for the minimum parameter values, similarly to maximum parameter distribution in FIG. 4c, however for the minimum distribution, the region 409 is located before the reliability range 407 with parameter values below the reliability range. FIG. 8a schematically illustrates one of the plurality of load sessions, in this case a load session over pressure, from which a minimum and a maximum parameter value is extracted. The dashed parameter lines 815, 401 illustrate the minimum parameter value and the maximum parameter value, respectively. The extracted minimum values and maximum values may each be arranged in a first and a second distribution portion 819, 817 that combined may form a distribution pattern. In FIG. 8b a distribution pattern is illustrated with an overall reliability range 821 extending between the first distribution portion 819 comprising the plurality of minimum parameter values 815 and the second distribution portion 817 comprising the plurality of maximum parameter values 401 extracted from the plurality of load sessions, illustrated in FIG. 8*a*. In more detail, the overall reliability range 821 extends from the minimum threshold 713 of the first distribution portion 819 to the maximum threshold 411 of the second distribution portion 817. The thresholds 713, 411 for the first and second distribution portions 819, 817 may be determined separately. The maximum threshold 411 may be determined according to the description relating to FIG. 3 and FIG. 4*c-d*. The minimum threshold 713 may be determined in the same way with respect to the minimum distribution. Each of the distribution portions may have a reliability range 407 extending from the threshold 411, 713 to the maximum or minimum of the parameter values depending on whether it is the first or the second distribution portion 819, 817. However, when two distribution portions, preferably a distribution portion 819 for minimum parameter values and a distribution portion 817 for maximum parameter values, are arranged in a distribution pattern, the range extending from the minimum threshold 713 of to the maximum threshold 411 represents an overall reliability range 821. The parameter values that fall outside the overall reliability range 821 are determined as being in the unreliable parameter region 409. The overall reliability range 821 may be used in operation for other load sessions, in this case for load session describing pressure. Furthermore, when comparing the overall reliability range 821 with sets of data, e.g. load sessions, the parameter values outside the reliability are determined to be unreliable and/or unrealistic. Furthermore, the unreliable values, values in the unreliable and/or unrealistic region 409, may be further analyzed and separated from the values which are determined to be reliable in order to make the management of the massive loads of data more efficient.

Even though the present subject matter has been described with reference to specific exemplifying embodiments thereof, many different alterations, modifications and the like will become apparent for those skilled in the art. Variations to the disclosed embodiments can be understood and effected by the skilled addressee in practicing the claimed invention, from a study of the drawings, the disclosure, and the appended claims. For example, the above description makes reference to a few embodiments. That is, the above description has mainly described how the reliability range may be determined for maximum parameter values; however the present subject matter is equally applicable to minimum parameter values which may be time dependent or to scalars such as life consumption, i.e. the invention should not be construed as limited to a reliability range for maximum parameter values. Thus, the above description of the example embodiment of the present invention and the accompanying drawings are to be regarded as a non-limiting example of the invention and the scope of protection is defined by the appended claims. In the claims, the word "comprises" does not exclude other elements or steps, and the indefinite article "a" or "an" does not exclude a plurality. A single computer or other unit may fulfill the functions of several items recited in the claims. The mere fact that certain measures are recited in mutually different dependent claims does not indicate that a combination of these measured cannot be used to advantage. Any reference sign in the claims should not be construed as limiting the scope.

The invention claimed is:

1. A method for determining a reliability range for a parameter of a component in a machine subjected to life reducing loads during operation, comprising:
   acquiring, for each of a plurality of load sessions, at least one parameter value for said component;
   generating a distribution pattern containing said parameter values for the plurality of load sessions;
   assigning a reliability range for the distribution pattern, wherein parameter values outside said reliability range are identified as unrealistic;
   analyzing the parameter values outside the reliability range to determine which of said parameter values outside the reliability range are confirmed to be unrealistic
   adjusting the reliability range if a ratio between the confirmed unrealistic parameter values and the considered unrealistic parameter values is outside a further range that is predetermined for the ratio;
   based on the reliability range assigning a consumption state; and
   then initiating a maintenance action based on the consumption state.

2. The method according to claim 1, wherein assigning a reliability range is executed by setting a predetermined range based on type of parameter and/or component.

3. The method according to claim 1, wherein confirming if said parameter values are realistic is executed by comparison to substantially similar load sessions.

4. The method according to claim 1, wherein said parameter is a time-dependent parameter comprising, for each of the plurality of load session, a maximum parameter value and a minimum parameter value.

5. The method according to claim 4, wherein said distribution pattern comprises a first distribution portion containing said minimum parameter values, and a second distribution portion containing said maximum parameter values.

6. The method according to claim 4, wherein said time-dependent parameter is one of temperature, mass flow, friction heat generation, pressure, rotor speed and a heat transfer coefficient for the component in the machine.

7. The method according to claim 1, wherein said parameter value is one of measurable operational data and a value calculated by said measurable operational data.

8. The method according to claim 1, wherein said parameter is a scalar constituted by a predicted life consumption of said component, and wherein said first distribution pattern comprises scalar values of the predicted life consumption for each of the plurality of load sessions.

9. The method according to claim 1, wherein said distribution pattern is constituted by a Weibull distribution pattern.

10. The method according to claim 1, wherein said load sessions are constituted by recorded loads from flight missions of aircrafts.

* * * * *